United States Patent
Rütter

[11] Patent Number: 6,033,032
[45] Date of Patent: Mar. 7, 2000

[54] WHEEL HUB BEARING UNIT ADAPTED FOR COLD FORMING CONNECTION TO THE BRAKE MEMBER

[75] Inventor: Andreas Rütter, Turin, Italy

[73] Assignee: SKF Industrie S.p.A., Turin, Italy

[21] Appl. No.: 08/908,471

[22] Filed: Aug. 6, 1997

[30] Foreign Application Priority Data

Oct. 31, 1996 [IT] Italy .................................. TO96A0884

[51] Int. Cl.[7] .................................................. B60B 27/00
[52] U.S. Cl. ......................................... 301/6.1; 301/105.1
[58] Field of Search ................................... 301/6.1, 6.91, 301/105.1; 188/218 R, 18 R

[56] References Cited

U.S. PATENT DOCUMENTS

| | | | |
|---|---|---|---|
| 1,869,876 | 8/1932 | Apple | 301/6.1 X |
| 1,993,430 | 3/1935 | Bell | 188/218 R |
| 2,103,201 | 12/1937 | Eksergian | 301/6.1 |
| 2,173,584 | 9/1939 | Frank | 301/105.1 X |
| 3,005,259 | 10/1961 | Benya et al. | 188/218 R |
| 3,105,709 | 10/1963 | Hanke | 301/111 X |

*Primary Examiner*—Russell D. Stormer
*Attorney, Agent, or Firm*—Merchant & Gould P.C.

[57] ABSTRACT

A vehicle wheel hub bearing unit is disclosed, in which the outer race (10) of the bearing has a radial bearing flange (11) providing an axially protruding edge (12) adapted for being folded by rolling in a radially outer direction to secure for rotation a flange (21) of the brake member (20). The brake flange (21) is clamped between the rolled edge (12') and a peripheral undeformed radial edge (13) of the same bearing flange (11). The hardness of the material forming the axial edge (12) to be deformed by rolling is between about 200 HV and 300 HV. This edge (12) protrudes axially from the brake flange (21) by a length (d) shorter than 5 mm. The thickness (e) of said edge (12) is within 1 and 3.5 mm. The axial thickness (a) of the edge (12') deformed by rolling against the brake flange (21) is less than 3.5 mm and the axial thickness (c) of the undeformed radial peripheral edge (13) exceeds said axial thickness (c) by a length x=0.4÷1 mm.

8 Claims, 2 Drawing Sheets

WHEEL HUB BEARING UNIT ADAPTED FOR COLD FORMING CONNECTION TO THE BRAKE MEMBER

DESCRIPTION

The present invention relates to the connection of the wheel hub bearing to the disc or drum brake member to be secured to the vehicle wheel.

To connect a brake member, of the disc or drum type, there are known solutions in which the outer race of the bearing has a radial flange providing an axially protruding edge. This edge is adapted for being folded by rolling in an axially outer direction so as to clamp a flange of the brake member for rotation therewith. The brake member flange is clamped between said rolled edge and an undeformed radial peripheral edge provided by the same bearing flange.

This kind of junction is intended for securing the bearing to the drum brake or a brake disc carrier in such manner as to prevent mutual rotation between the brake member and the bearing. Generally, the rolled edge is rather thin as this junction does not undergo considerable axial nor radial loads.

Although cold forming, and particularly rolling, is in many aspects an advantageous process, e.g. because it enables close dimensional accuracy to be achieved, in the past the above discussed production of rolled junctions has sometimes resulted in problems due to stress concentration of the deformed or rolled parts or deformation caused to components involved. The rolled edge and the other parts co-operating with it form a complex unit of interrelated parts for which no equilibrium arrangement of the geometry has been found yet, specifically for different materials involved. It is desired to provide a geometry according to which rolling does not give rise to high forces causing deformation of the components involved (e.g. the braking surface) nor causes stress concentration in the rolled parts, thereby ensuring a stable restraint over time capable of keeping the brake and the rotating race of the bearing fixed for rotation. To provide an efficient locking action, the rolled portion should have adequate thickness. Deformation of a thick edge can cause deformation of the brake member or the brake carrier, or otherwise give rise to stress concentration in the same rolled edge. On the other hand, an excessively thin edge will not ensure a clamping action capable of withstanding the forces applied to the junction in normal operation conditions.

Accordingly, it is a primary object of the present invention to overcome one or more disadvantages and limitations of the prior art.

Specifically, it is an object of this invention to ensure a reliable connection of the brake and to bearing whilst avoiding deformation and stress concentration.

According to the present invention, the above and further objects are attained by a vehicle wheel hub bearing unit, wherein the outer race of the bearing has a radial bearing flange providing a first axially protruding edge adapted for being folded by rolling in a radially outer direction to secure for rotation a flange of the brake member by clamping the brake flange between said first rolled edge and a second peripheral undeformed radial edge of the same bearing flange, characterised in that the hardness of the material forming said first edge to be deformed by rolling is between about 200 HV and about 300 HV;

said first edge protrudes axially from the brake flange by a length (d) shorter than 5 mm;

the thickness (e) of said first edge is within about 1 and about 3.5 mm; and the axial thickness (a) of said first edge deformed by rolling against the brake flange is less than 3.5 mm and the axial thickness (c) of said second undeformed radial peripheral edge exceeds said axial thickness (a) by a length x=0.4÷1 mm.

Advantageous embodiments of the invention are defined in the dependent claims.

In order that the present invention may be well understood there will now be described a few preferred embodiments thereof, given by way of example, reference being made to the accompanying drawings, in which.

Figure 1:
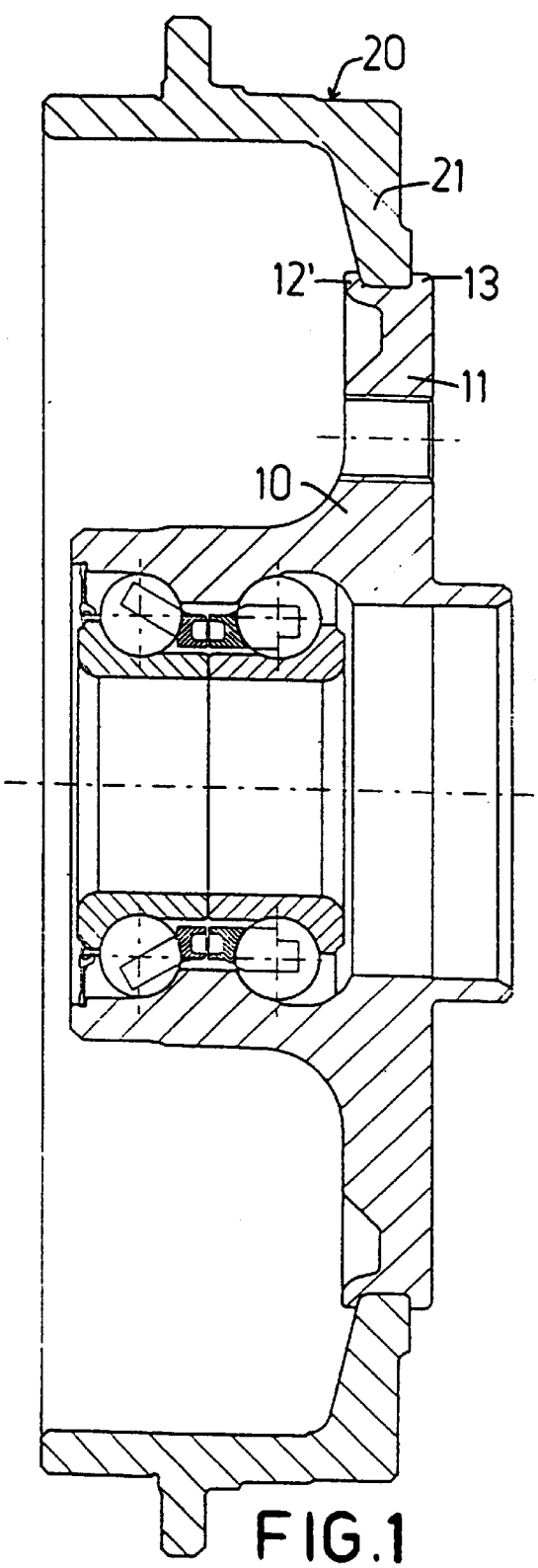
FIG. 1 is an axial sectional view of a vehicle wheel hub bearing unit to which a brake member, in this instance of drum type, is secured by rolling.

With reference initially to FIG. 1, there is shown a bearing unit of the hub of a vehicle. The outer race 10 of the bearing has a radial flange 11 provided with an axially protruding edge 12 that is folded by rolling in a radially outer direction to secure for rotation a radially outer flange 21 of a brake member 20, in this instance of the drum type. Those skilled in the art will understand that the same considerations will also apply to a disc-like kind of brake. The rolling step clamps the brake flange 21 between the rolled edge 12 and an undeformed radial peripheral edge 13 of the same bearing flange. Once clamping is completed, the bearing flange 11 and the brake flange 21 are substantially aligned in the same radial plane.

Figure 2:
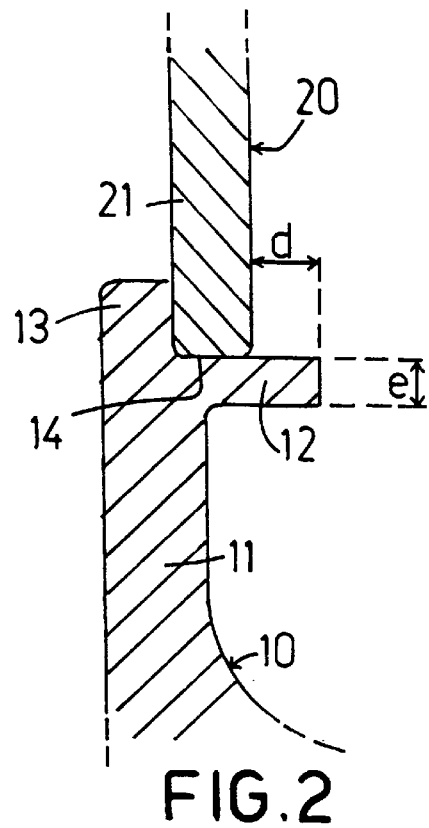
FIG. 2 is a partial axial sectional view to an enlarged scale of a wheel hub flange and a flange of the brake member to be secured by cold forming, particularly rolling.
Figure 3:
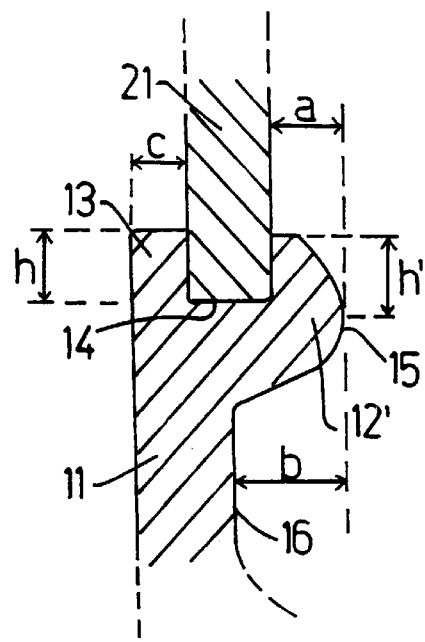
FIG. 3 shows a detail of FIG. 2 after rolling.

As shown in FIG. 2, prior to rolling the brake member 20 is applied to the bearing flange abutting against the axial edge 12. After rolling, the shape of the connection between the bearing and the brake is that depicted in FIG. 3.

The edge 12 to be deformed by rolling should be hard enough to withstand cold forming by being bent and capable of efficiently locking the brake member. Due to the reduced thickness of the edge, excessive hardness often turns out in brittleness. It has been found that to avoid such a drawback, the edge 12 to be rolled must have hardness between 200 HV and 300 HV.

Still with reference to FIG. 2, the axial edge 12 in its original undeformed condition should have thickness e comprised within about 1÷3.5 mm. The axial length of the edge 12 ought to be such as to define a protruding length d shorter than 5 mm and preferably comprised within the 2÷5 mm range.

Cracks are likely to appear when the value e exceeds the above interval. Moreover, in this case an excessively high force has to be applied which tends to deform the contrasting edge 13 and therefore the braking surface.

After rolling, the axial thickness a of the rolled edge 12' should be $a \leq 3.5$ mm.

The axial thickness c of the undeformed radial edge 13 should be large enough to withstand loads resulting from the rolling operation without allowing the flange 21 to be deformed. It has therefore been found that the undeformed edge has to be thicker than the rolled edge, in accordance with the relation:

$$c \geq a + x$$

where x=0.4÷1 mm.

The radial height h of the undeformed edge 13, calculated starting from the cylindrical surface 14 of the bearing flange 14, shall be h≧2 mm and the radial height h' of the rolled edge 12', still calculated starting from surface 14, shall be h'≦6 mm.

The dimensions of h and h' have to be correlated in order to keep the brake member straight in the radial vertical plane during rolling.

To prevent cracks from forming in the rolled surface 15 and at the same time avoid constructional weakness, i.e. the incapacity to transmit through rolling a clamping force high enough to avoid rotation of the brake relative to the bearing, the rolled surface bending radius r shall be r≦6 mm and preferably r=2÷5 mm.

The axial depth b, defined as the axial distance between the side wall 16 of the bearing flange 11 and the apex of rolled surface 15, shall be b≦8 mm to allow for a tool to be inserted in this zone for the rolling operation.

Figure 4:
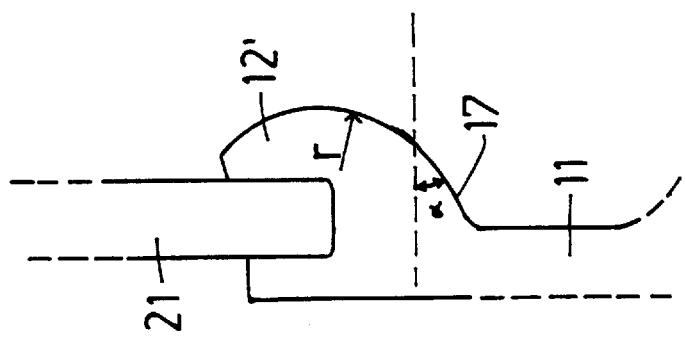

With reference to the detail of FIG. 4, where the rolled surface forms a quite extended rounded portion, designating with α the angle formed by the radially innermost surface 17 of the rolled edge 12' with the horizontal line, it will preferably be

0°≦α≦20° with a bending radius r with in the following range 1 mm≦r≦4 mm.

Figure 5:
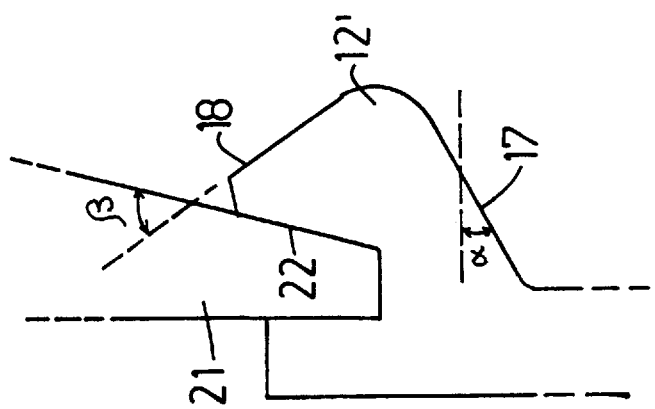

With reference to the variant embodiment of FIG. 5, wherein the rolling step yields a somewhat sharper deformed edge 12', the angle β defined between the radially outer surface 18 of the rolled edge 12' and the surface 22 of the brake flange 21 shall be

5°≦β≦15°

Figure 6:
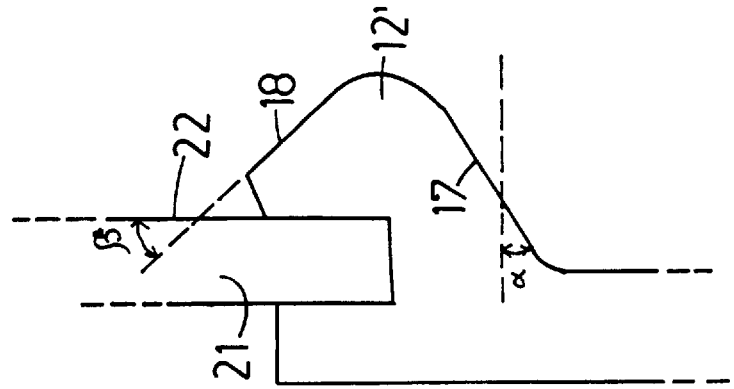
FIGS. 4, 5 and 6 show to an enlarged scale three variants of the connection between the bearing unit and the brake member, respectively.

FIG. 6 illustrates an embodiment in which there is produced a rolled edge similar to the one of FIG. 5 but with a brake flange 21 being flat instead of tapered towards the centre.

I claim:

1. A vehicle wheel hub bearing unit, wherein an outer race (10) of the bearing has a radial bearing flange (11) providing a first axially protruding edge (12) adapted for being folded by rolling in a radially outer direction to secure for rotation a flange (21) of a brake member (20) by clamping the brake flange (21) between said first rolled edge (12') and a second peripheral undeformed radial edge (13) of the same bearing flange (11), wherein:
    the hardness of the material forming said first edge (12) to be deformed by rolling is between about 200 HV and about 300 HV;
    said first edge (12) protrudes axially from the brake flange (21) by a length (d) shorter than 5 mm;
    the thickness (e) of said first edge (12) is within about 1 and about 3.5 mm; and
    the axial thickness (a) of said first edge (12') deformed by rolling against the brake flange (21) is less than 3.5 mm and the axial thickness (c) of said second undeformed radial peripheral edge (13) exceeds said axial thickness (a) by a length x=0.4÷1 mm.

2. A bearing unit as claimed in claim 1, wherein a radial height (h) of said second edge (13) of the radial flange (11) is h≧2 mm.

3. A bearing unit as claimed in claim 2, wherein a radial height (h') of said first rolled edge (12') is h'≦6 mm.

4. A bearing unit as claimed in claim 1, wherein a bending radius (r) of the rolled surface (15) of said rolled edge (12') is r≦6 mm.

5. A bearing unit as claimed in claim 4, wherein r=2÷5 mm.

6. A bearing unit as claimed in claim 1, wherein an axial distance (b) between the side wall (16) of the bearing flange (11) and the apex of rolled surface (15) of the first rolled edge (12') is b≦8 mm.

7. A bearing unit as claimed in claim 1, wherein an angle (α) between the radially innermost surface (17) of the rolled edge (12') and the horizontal line is 0°≦α≦20°.

8. A bearing unit as claimed in claim 1, wherein angle (β) defined between the radially outer surface (18) of the rolled edge (12') and the surface (22) of the brake flange (21) is 5°≦β≦15°.

* * * * *